(12) United States Patent
Neyestani

(10) Patent No.: US 6,830,203 B2
(45) Date of Patent: Dec. 14, 2004

(54) SELF-DISCHARGING DRIP IRRIGATION

(76) Inventor: Mohammad Neyestani, 22234, Victory Blvd., Apt. G216, Woodland Hinns, CA (US) 91367

(*) Notice: Subject to any disclaimer, the term of this patent is extended or adjusted under 35 U.S.C. 154(b) by 169 days.

(21) Appl. No.: 09/893,816

(22) Filed: Jun. 27, 2001

(65) Prior Publication Data

US 2003/0001029 A1 Jan. 2, 2003

(51) Int. Cl.[7] .............................................. B05B 15/00
(52) U.S. Cl. ........................ 239/542; 239/267; 239/547
(58) Field of Search ................................ 239/267, 269, 239/271, 542, 547, 569, 570, 589; 47/48.5

(56) References Cited

U.S. PATENT DOCUMENTS

| | | | | |
|---|---|---|---|---|
| 2,755,985 A | * | 7/1956 | Finegan ...................... | 239/267 |
| 3,221,996 A | * | 12/1965 | Emmert et al. ............. | 239/542 |
| 4,037,791 A | * | 7/1977 | Mullett et al. .............. | 239/542 |
| 4,100,940 A | * | 7/1978 | Spears ........................ | 239/542 |
| 5,839,659 A | * | 11/1998 | Murray ....................... | 239/542 |
| 6,036,104 A | * | 3/2000 | Shih ............................ | 239/542 |
| 6,394,368 B1 | * | 5/2002 | Hintz ........................... | 239/542 |

* cited by examiner

Primary Examiner—Steven J. Ganey
(74) Attorney, Agent, or Firm—Raymond Y. Chan; Raymond and Raymond Patent Group

(57) ABSTRACT

A self-discharging drip irrigation system includes at least an elongated drip irrigation hose for operatively extending from a water supply, an emitter for directing water from the drip irrigation hose to a cultivating area, wherein the emitter comprises a flow regulating passage, wherein the flow regulating passage has at least an inlet section operatively connected to the irrigation hose, at least an outlet section for dripping the water to the cultivating area and a laminar flow region between the inlet section and the outlet section. The emitter further may comprises at least a venturi accelerator mounted on the inlet section. Whereby according to the "Bernoulli's Theorem" due to the land slop between the water supply and the cultivating area, which creates a gravity potential water is flowed from the water supply through the drip irrigation hose through the emitter and dripping to the cultivating area.

4 Claims, 7 Drawing Sheets

SELF-DISCHARGING DRIP IRRIGATION

BACKGROUND OF THE INVENTION

1. Field of Invention

The present invention relates to a drip irrigation system, and more particularly to a self-discharging drip irrigation system which can eliminate the energy consumption while being cost effective.

2. Description of Related Arts

Drip irrigation is recognized as an advanced technology in the field of irrigation methodology for various cultivation. The advantages of the drip irrigation are that can minimize the water consumption, reduce energy and labor costs, irrigate plant more frequent, so as to increase the quantity and quality of crop production, improve soil aeration, reduces risk of drainage and salinity problems, water can be applied more uniform in the root zone, nutrition can be used more efficient through the system and control weed growth.

During the last four decades an extremely large numbers of drippers, emitters, bubblers, micro-jets, micro-sprayers, etc. have been designed, manufactured, and used to irrigate orchards, vegetables, row crops, nurseries and green houses. Reviewing the development of drip irrigation technology shows a reasonable improvement in practicing drip irrigation methodology. However unfortunately, not any appreciable effort has been made to review, or reconsider the economical feasibility in the field of drip irrigation system.

A conventional drip irrigation system comprises a supply line operatively extended from a water source, at least a feeding pipe having a drip irrigation hose extended from a manifold for distributing the water to a cultivating area, and at least a valve for controlling a flow of water through the connecting pipe.

To operate a conventional drip irrigation system the water has to be transported from the water source to the cultivating area, by applying a predetermined pressure, and the pressure must be applied by the water pump to pump the water through the supply and feeding lines. Practically, the average pressure required to properly operate the conventional drip irrigation system is in the range of 45 to 70 psi (3 to 5 atmospheres), and the average demanding power is in the range of 0.5.0 to 1.0 horse-power per hectare. Accordingly, the supply pipe, main line, sub-main, lateral, and manifold must be strong enough to operate under such high pressure. The conventional drip irrigation system, also requires a filtration unit as well a power plant to operate the system.

In the other hand, the applied pressure must be dissipated through a complicated pressure compensating emitters or drip tubes to control the steady flow rate of water and to provide a reasonable distribution uniformity of water. So, the initial investment costs of the conventional drip irrigation system will be extremely high including the installation cost and maintenance cost. Besides, the energy consumption of the conventional drip irrigation system is relatively high so as to increase the operational costs of the system.

Consequently, with regards to the foregoing disadvantages, practicing of a conventional drip irrigation system, economically is not feasible to be used by most low income farmers, so it is only applicable and affordable for growers of high value crops.

As a result, the growers tend to refuse to use the conventional drip irrigation system which causes the slow development of drip irrigation system especially in undeveloped countries.

Accordingly, The FAO statistical claimed and census 1998 of the United State Department of Agriculture (USDA) of drip irrigation development show that less than one percent (1%) of irrigated lands in the world; 4.2% of irrigated farms, and 8.6% of horticultural land in the United States are pr0acticing drip irrigation methodology.

The foregoing record is a good index that shows drawbacks of the conventional drip irrigation technology, after a half century of practicing this methodology. It is well known by those experts in agricultural economy, that the most problems involved in slow development of drip irrigation system arise from high investment and operational costs Therefore, it is necessary to review and reconsider the economical feasibility of drip irrigation system and introduce a simplified and new technology to overcome disadvantages of the conventional drip irrigation system.

SUMMARY OF THE PRESENT INVENTION

A main object of the present invention is to provide a self-discharging drip irrigation system, which can reduce the energy consumption while being coast effective.

Another object of the present invention is to provide a self-discharging drip irrigation system, which is capable of transporting a predefined flow of water from a water supply or reservoir to a cultivating area under gravity potential.

Another object of the present invention is to provide a self-discharging drip irrigation system for eliminating costly pumping plant and annual energy costs, which are essential to operate the conventional drip irrigation system.

Another object of the present invention is to provide a self-discharging drip irrigation system which is adapted to eliminate filtration unit and reduces investment and maintenance costs.

Another object of the present invention is to provide a self-discharging drip irrigation system that drips at high emission uniformity (EU) over a wide range of hydraulic head or gravity potential.

Another object of the present invention is to provide a self-discharging drip irrigation system which is simple to install and easy to use.

Another object of the present invention is to provide a simple, inexpensive and easy manufactured self-discharging drip irrigation system to be affordable for low-income farmers and low educated growers in all other countries.

Another object of the present invention is to provide a self-discharging drip irrigation system which is reliable to eliminate clogging and plugging of the system by dirt and debris.

Another object of the present invention is to provide a self-discharging drip irrigation system that can operate in boat surface and subsurface installation.

Another object of the present invention is to provide a self-discharging drip irrigation system to accelerate the development of this art in the United States and in the other countries.

Accordingly, in order to accomplish the above objects, the present invention provides a self-discharging drip irrigation system to solve the technological and economical problems involved in the field of conventional drip irrigation systems.

The self-discharging drip irrigation system is directed to an elongated drip irrigation hose having a transiting waterway for operatively extending from a water reservoir and at least an external emitter having a flow regulating passage extended from the drip irrigation hose, wherein the flow regulating passage has a laminar flow region, wherein a cross-sectional area of the laminar flow region is smaller than that of the transiting waterway. The emitter can be non-pressure compensating emitter to save the pressure applied and to eliminate sedimentation of debris through the emitter.

The emitter has at least one inlet section connected to the drip irrigation hose for communicating the flow regulating passage with the transiting waterway, at least one outlet section for dripping the water to a cultivating area, and at least one laminar flow region defined between the inlet section and the outlet section. The emitter further may comprises at least one venturi accelerator mounted between the inlet section and the outlet section for accelerating the water flow from the inlet section to the outlet section.

In operation, the water flows from a water reservoir through a conventional supply pipe to the drip irrigation hose by gravity potential. Then, the water enters the emitter from the inlet section thereof and exits at the outlet section to the cultivating area to water plants. It is obvious by one expert in fluid mechanics, wherein the gravity potential is attainable in all irrigated farms and dry lands. However, the self-discharging drip irrigation system of the present invention is capable of operating over a wide range of hydraulic head incorporated with a water pump or any other hydraulic pressurized device

DETAILED DESCRIPTION OF THE PREFERRED EMBODIMENT

Figure 1:
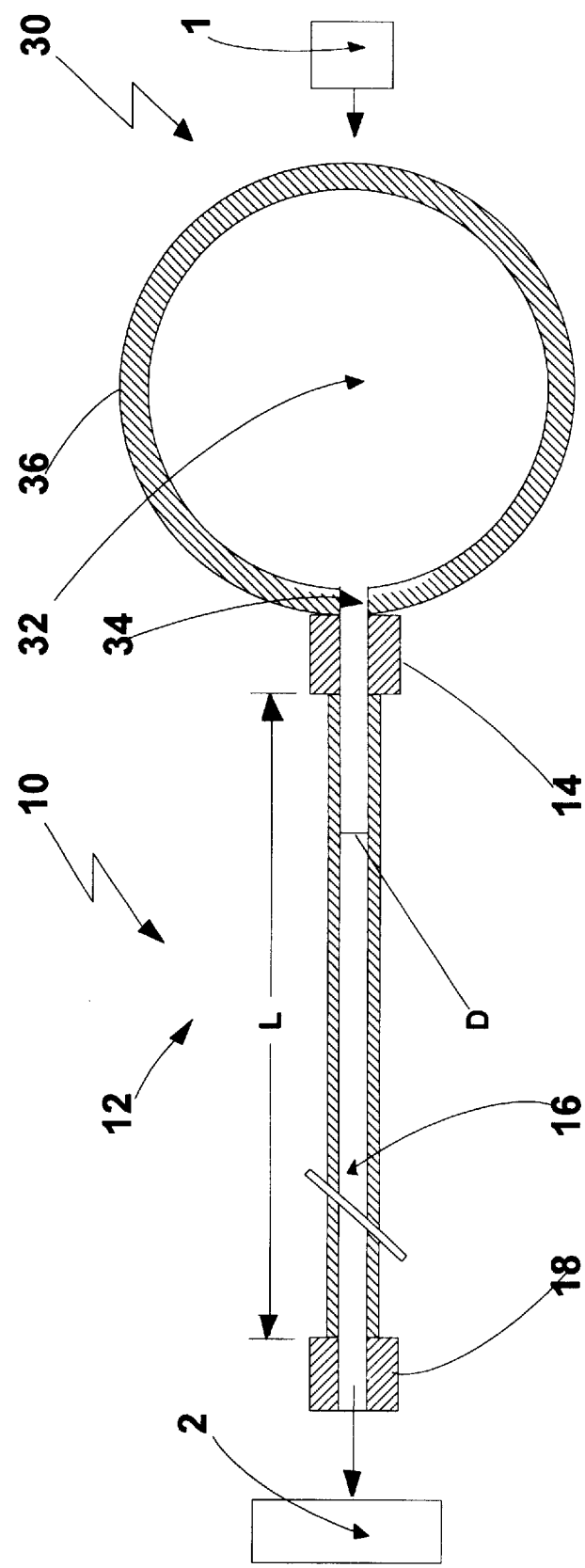
FIG. 1 is a sectional view of a self-discharging drip irrigation system according to a first preferred embodiment of the present invention.

In describing a preferred system of the invention illustrated in the drawings, specific terminology will be restored to for the sake of clarity. However, the invention is not intended to be limited to the specific terms so selected, and it is to be understood that each specific term includes all technical equivalents which operates in a similar manner to accomplish a similar purpose.

Referring to FIG. 1 of the drawings, a self-discharging drip irrigation system according to a first preferred embodiment of the present invention is illustrated, which is applicable in large size farms as well as small farms, orchard fruits, row crops and green houses, The self-discharging drip irrigation system is capable of effectively directing the water from a water supply 1 to a cultivating area 2 for irrigating water plants thereon.

The water supply 1, such as a conventional water supply, comprises a water reservoir and at least a water supply pipe (not shown) that enables water being transported from the water supply 1 to the self-discharging drip irrigation system wherein the water supply reservoir 1 is located in a higher position than the cultivating area 2, so as to create a gravity potential between the water supply reservoir 1 and the cultivating area 2. In other words, the water in the water supply 1 tends to flow downward to the cultivating area 2 by the gravity potential. The water supply 1 further comprises a control switch (not shown) for selectively controlling the water flowing from the water supply 1 to the self-discharging drip irrigation system.

The self-discharging drip irrigation system as shown in FIG. 1 comprises an elongated drip irrigation hose 30 having a transiting waterway 32 for operatively extending from a water supply 1 and at least a non-pressure compensating emitter 10. The emitter 10 as depicted in FIG. 1 comprises an elongated flow regulating passage 12, the flow regulating passage 12 has at least one inlet section 14 connected to the drip irrigation hose 30 for communicating the flow regulating passage 12 with the transiting waterway 32, and at least one outlet section 18 for dripping the water to a cultivating area 2. The flow regulating passage 12 has a straight shaped conduit and defines a laminar flow region 16 between the inlet section 14 and the outlet section 18, wherein a cross-sectional area of the laminar flow region 16 is smaller than that of the transiting waterway 32. The laminar flow region 16 of the flow regulating passage 12 has a smooth interior surface for reducing a friction thereof so as to not only decreases the dissipating of the hydraulic head which is created by gravity potential but also eliminates the sedimentation of dirt and debris through the laminar flow region 16 thereof.

The drip irrigation hose 30 as depicted in FIGS. 1 to 6 has at least an opening 34 formed on a wall thereof wherein the inlet section 14 of the emitter 10 is operatively connected to the opening 34 of the irrigation hose 30, so as to communicate the flow regulating passage 12 with the transiting waterway 32.

In operation, the water flows from the water supply 1, through the water supply pipes (not shown) to the drip irrigation hose 30. Then, the water enters the emitter 10 from the opening 34 into the inlet section 14, through the flow regulating passage 12 thereof and exits at the outlet section 18 to the cultivating area 2.

Accordingly, the drip irrigation hose 30 can be a conduit, a manifold, a pipe, or the like. The purpose of the drip irrigation hose 30 is to provide a tubular structure for the water passing therethrough and directing the water to the emitter 10 by gravity potential or by a pressurized device such as incorporating a water pump with the water supply.

According to the present invention, the irrigation hose 30 shown in FIG. 1 can be formed from an elongated strip 36 of plastic film having a thickness from 0.1 to 0.5 millimeters. It is worth to mention that since the irrigation hose 30 is operated under a low pressure condition, the thickness of the irrigation hose 30 and the supply pipes of the water supply 1 can be further reduced in comparison with the thickness of the conventional drip irrigation system, so as to minimize the total investment costs of the present invention.

The drip irrigation hose 30 can be made by any suitable method known to those skilled in the art. The strip 36 of the drip irrigation hose 30 can be folded longitudinally to form overlapping inner and outer longitudinal margins. A longitudinal rib seals the margins. Alternatively, the irrigation hose 30 can be made of any suitable material, such as polyethylene or polyethylene blend. The irrigation hose 30 can be in tape form or in hard hose form.

The emitter 10 depicted in FIGS. 1 to 6 is a unibody emitter, in essence, a single-piece emitter that forms as inseparable assembly. Alternatively, the emitter 10 can be made by two or more materials to form a single piece, which can be achieved, by injection, or sequential molding. Preferably, the emitter 10 can be made by polyethylene, silicone, or thermoplastic. The emitter 10 can be rigid or flexible, but preferably is semi-rigid, i.e. capable of deforming to the desire shape. The emitter 10 can be made by any other method known to those skilled in the art.

The emitter 10 is securely attached to an exterior of the drip irrigation hose 30. The attachment can be made by any suitable connection, for example connector or adapter. The emitter 10 can be located entirely the exterior of the drip irrigation hose 30

It is worth to mention that the dimensions of the laminar flow region 16 has a significant effect on the flow rate of the emitter 10. Based on the principle of hydraulic, the designed length L of the laminar flow region 16 of the invented emitter 10 shown in FIG. 1 is directly proportional to the gravity potential P, whereby P is in essence and by definition a hydraulic head created by gravity potential between the water supply 1 and the cultivating area 2 and mathematically can be shown as:(LfP). And the designed diameter D of the laminar flow region 16 is inversely proportional to the gravity potential P, and mathematically can be shown as: (Df1/P).

It is well known in fluid mechanics, pipes are used for transporting water. According to the "Bernoulli's Equation", the flow rate of water passing through the irrigation hose 30 of the present invention under gravity potential, which is created by land slope can be determined as follow:

$$Q=(0.0191)(S^{0.54})(D^{2.6274}) \quad (1)(\text{PVC-pipe})$$

Where Q is the flow rate passing through drip irrigation hose 30, in liter/sec.; S is defined as the land slope in %; and D is the diameter of the drip irrigation hose 30 in centimeter. It is worth to know, that the foregoing mathematical formula is applicable wherein the hose is made of PVC material or the like. The formula for PE hose or tubing can be determined as follow:

$$Q=(0.0178)(S^{0.54})(D^{2.6274}) \quad (2)(\text{PE-pipe})$$

According to the "Christiansen's Mathematical Development", the flow rate of water through the drip irrigation hose 30, feeding with a number of the emitter 10 along its length under gravity potential the equations (1) and (2) can be determined, respectively as follow:

$$Q=(0.0191)((S/F)^{0.54})(D^{2.6274}) \quad (3)(\text{PVC-pipe})$$

$$Q=(0.0178)((S/F)^{0.54})(D^{2.6274}) \quad (4)(\text{PE-pipe})$$

where $$F=(\tfrac{1}{3})+(\tfrac{1}{2}N)+1/(6N2) \quad (5)$$

and where N=the number of the emitter 10 of the preset invention.

And according to the "Torricelli's Theorem", the mathematical model for flow rate through the emitter 10 can be written as:

$$Q=C(\pi D^2/4)(2GP)^{0.5} \quad (6)$$

where G is the gravitational acceleration, in centimeter/$s^2$; P is defined as the gravity potential in centimeter; and C is a coefficient of discharge and depends on the technical criterion and configuration of the non-pressure compensating emitter 10, which is determined by experiment.

The simplified form of the equation (6) can be shown as:

$$Q=0.03477C(D^2)(P^{0.5}) \quad (7)$$

or $$Q=K(D^2)(P^{0.5}) \quad (8)$$

Where K value for the emitter 10 has been figured out experimentally and for five more desirable model of the emitter 10 of the present invention are given as follow:

K1=0.001877; K2=0.002294; K3=0.002744; K4=0.003333; K5=0.005377

To convert the value of Q from liter/sec. to liter/hour, the K's value changes to:

K1=6.76; K2=8.26; K3=9.88; K4=12.00; K5=19.36

Consequently, based on the result I have accomplished through a comprehensive research work, the validity and applicability of the "Bernoulli's Equation, and Torricelli's Theorem" in practicing: "self-discharging drip irrigation methodology" and the objects of the present invention is achieved, so as hopefully and confidently, in 2001 a technological breakthrough will be resulted in this art.

Figure 2:
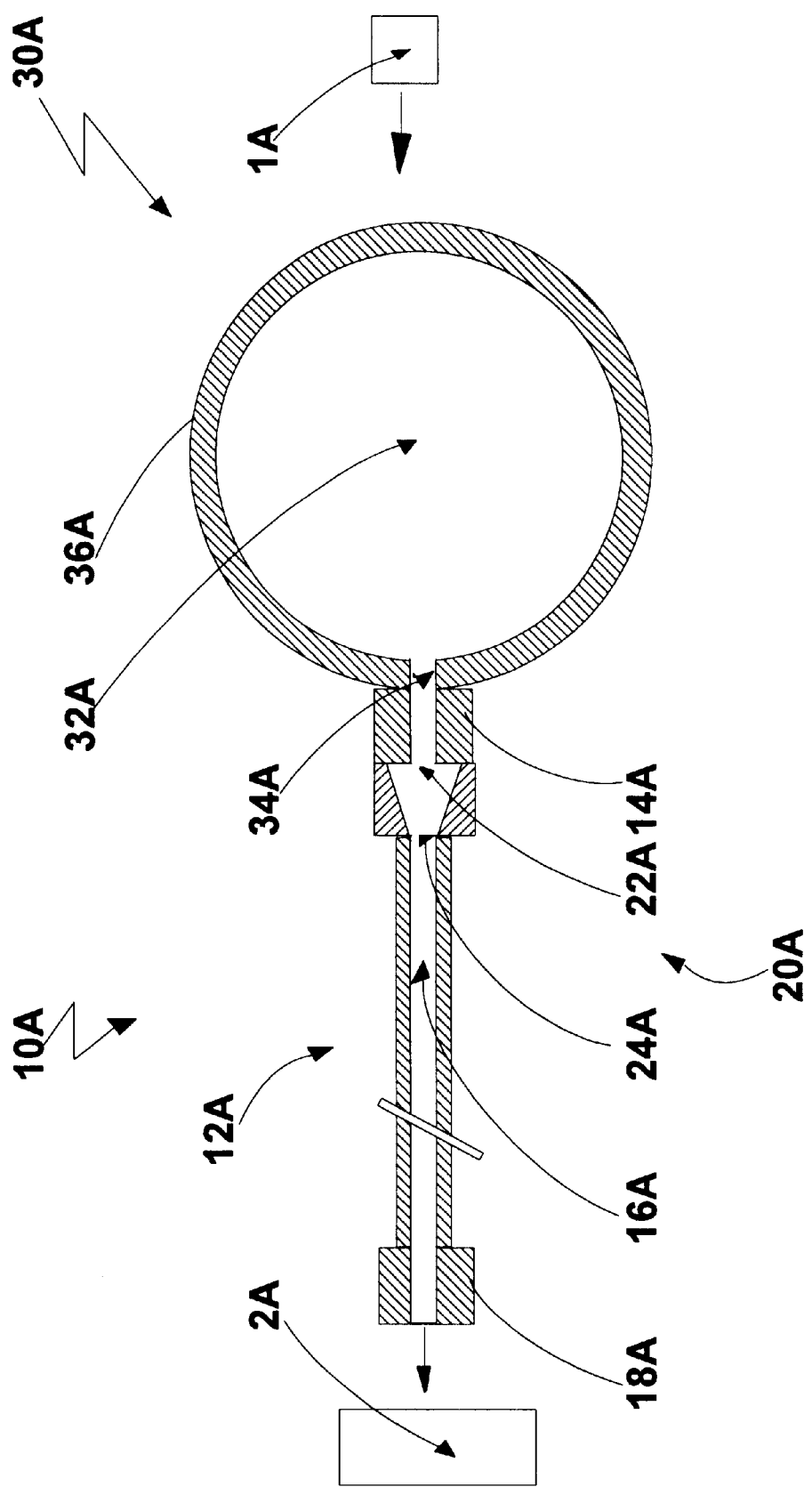
FIG. 2 illustrates a first alternative mode of an emitter of the self-discharging drip irrigation system according to the above first preferred embodiment of the present invention.

FIG. 2 illustrates a first alternative mode of the emitter 10A which has at least one inlet section 14A, at least one outlet section 18A, and at least one laminar flow region 16A. The emitter 10A further comprises at least one venturi accelerator 20A mounted on the inlet section 14A of the flow regulating passage 12A for accelerating the velocity of water and decreasing the high pressure created by gravity potential. The venturi accelerator 20A has an entrance end 22A and an exit end 24A, wherein a diameter of the entrance end 22A of the venturi accelerator 20A is larger than that of the exit end 24A, and wherein a diameter of the exit end 24A is equal a diameter of the laminar flow region 16A.

Accordingly, the venturi accelerator 20A having a tubular shaped is securely attached to the inlet section 14A of the flow regulating passage 12A, The venturi accelerator 20A has a cone shaped interior such that an inner diameter of the venturi accelerator 20A is gradually decreasing from the entrance end 22A to the exit end 24A thereof. As it is obvious by one skilled in the art, the venturi accelerator 20A at the inlet section 14A is capable of speeding up the velocity of the water while entering the laminar flow region 16A of the emitter 10A. The emitter 10A of such criterion is useful for gravity potential in the range of a few centimeters to 50 centimeters, (1" to 20").

Figure 3:
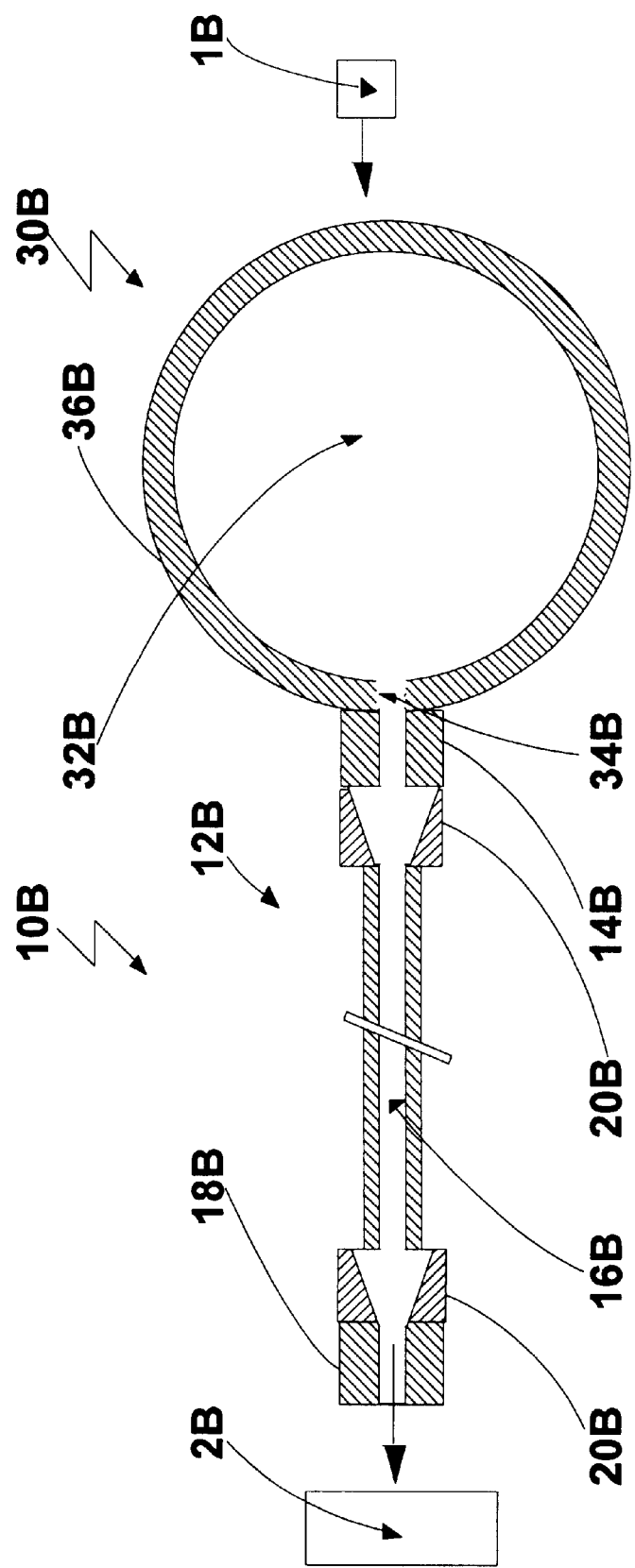
FIG. 3 illustrates a second alternative mode of the emitter of the self-discharging drip irrigation system according to the above first preferred embodiment of the present invention.

FIG. 3 illustrates a second alternative mode of the emitter 10B which has at least one inlet section 14B, at least one outlet section 18B, and at least one laminar flow region 16B. The emitter 10B further comprises two venturi accelerators 20B mounted on the inlet section 14B and the outlet section 18B of the emitter 10B respectively. Therefore, the venturi accelerator 20B at the inlet section 14B is capable of speeding up the velocity of the water from the inlet section 14B to the laminar flow region 16B of the emitter 10B. The venturi accelerator 20B at the outlet section 18B is also capable of speeding up the velocity of the water while entering the outlet section 18B of the emitter 10B, so as to eliminate the effect of back-flow and prevent the sedimentation of any suspended dirt and debris clogged at the outlet section 18B of the emitter 10B. The emitter 10B of such specification is used when the gravity potential is in the range of 50 to 100 centimeters, (20" to 40").

Figure 4:
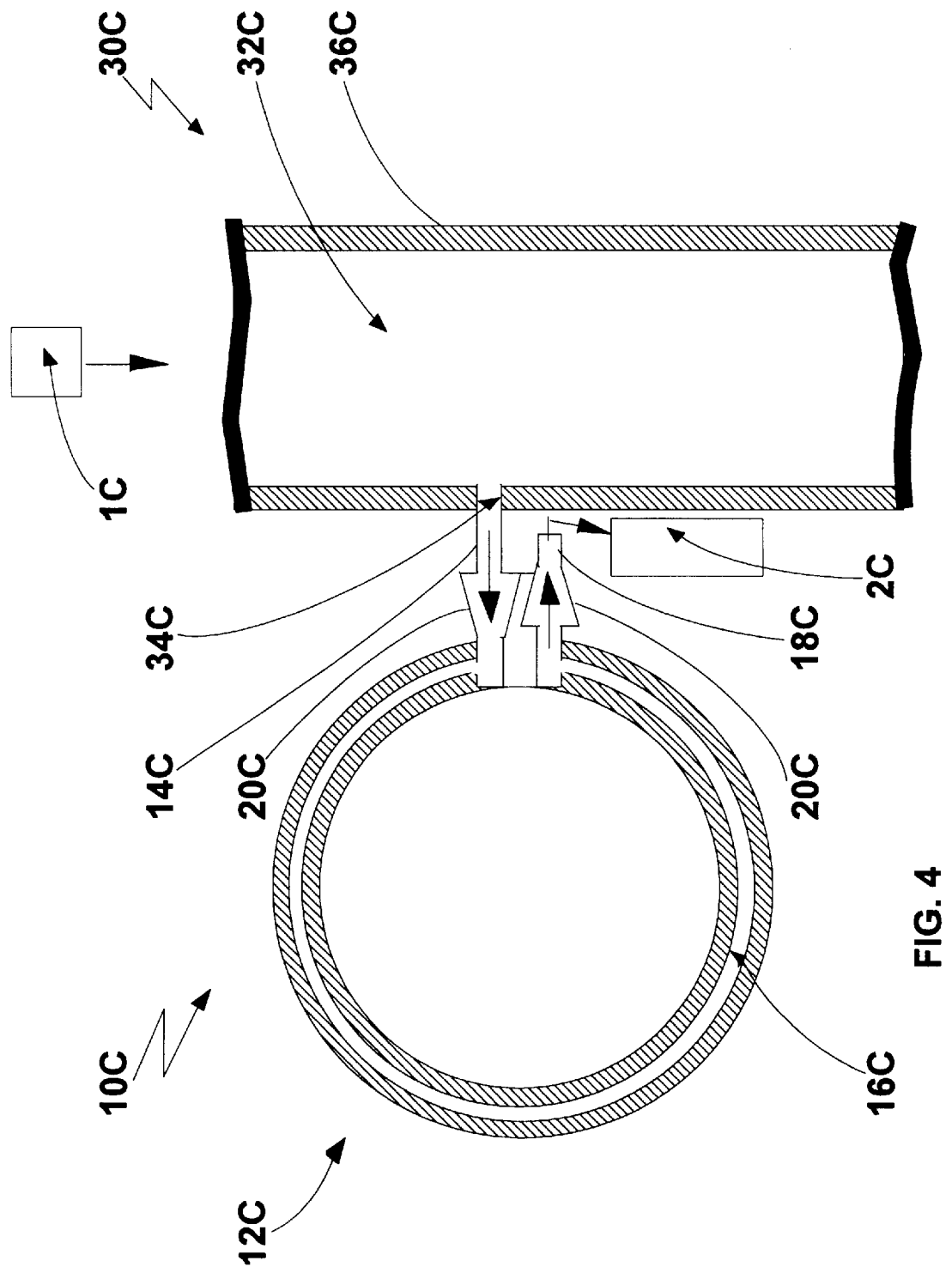
FIG. 4 illustrates a third alternative mode of the emitter of the self-discharging drip irrigation system according to the above first preferred embodiment of the present invention.

FIG. 4 illustrates a third alternative mode of the emitter 10C which has at least one inlet section 14C, at least one outlet section 18C, and one laminar flow region 16C. As shown in FIG. 4 the laminar flow region 16C having a curved shaped defined between the inlet section 14C and the outlet section 18C, wherein the two venturi accelerators 20C are mounted on the inlet section 14C and the outlet section 18C respectively. The emitter 10C of such criterion preferably is used to dissipate higher range of gravity potential, for example 100 to 200 centimeters, (40" to 80").

Figure 5:
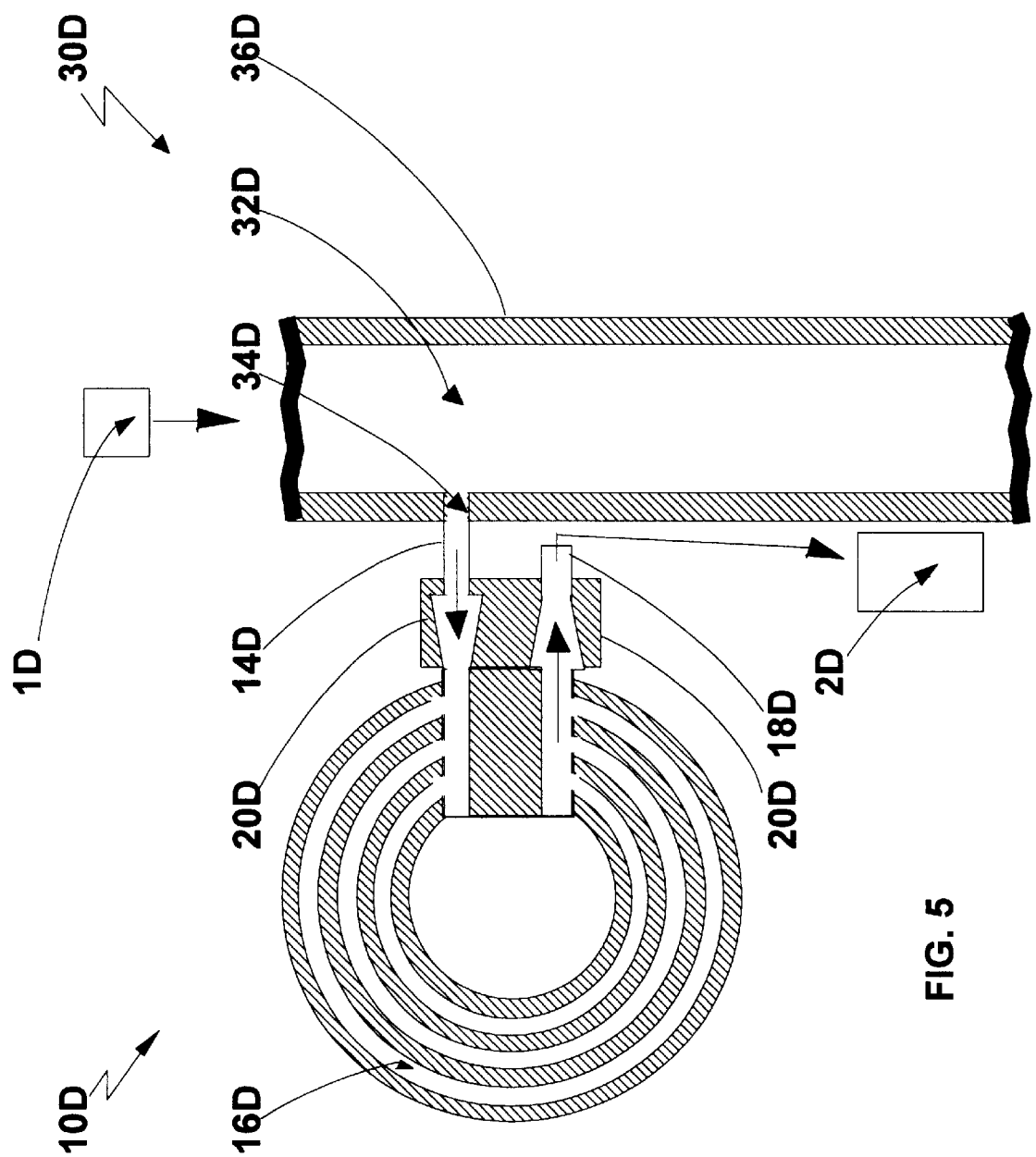
FIG. 5 illustrates a fourth alternative mode of the emitter of the self-discharging drip irrigation system according to the above first preferred embodiment of the present invention.

FIG. 5 illustrates a fourth alternative mode of the emitter 10D which has at least one inlet section 14D, at least one outlet section 18D, and one laminar flow region 16D As depicted in FIG. 5 the laminar flow region 16D having a spiral shaped defined between the inlet section 14D and the outlet section 18D, wherein the two venturi accelerators 20D are mounted on the inlet section 14D and the outlet section 18D respectively. The emitter 10D of such criterion preferably is used to dissipate very high range of gravity potential, for example 200 to 500 centimeters, (80" to 200").

Figure 6:
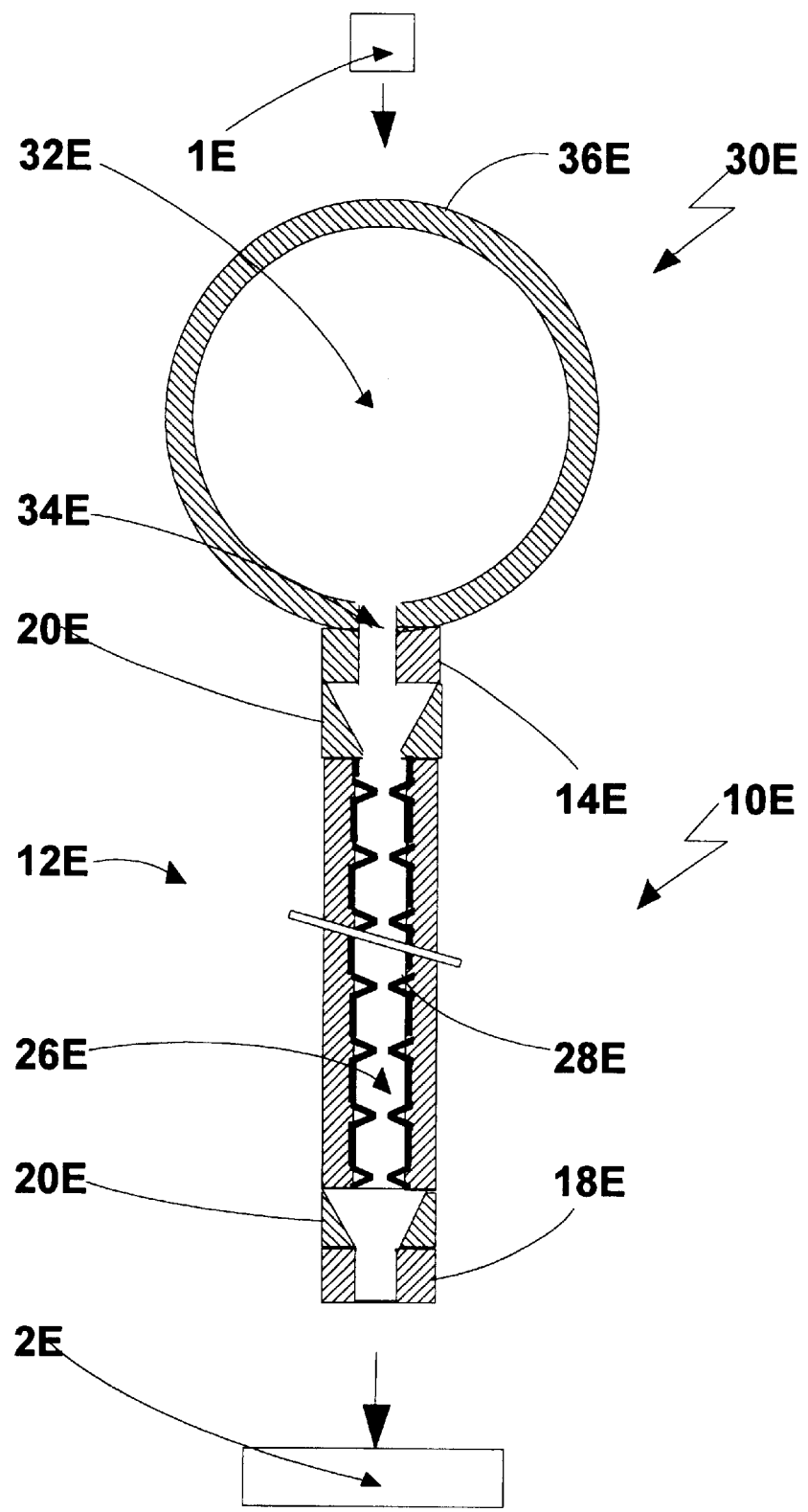
FIG. 6 illustrates a fifth alternative mode of the emitter of the self-discharging drip irrigation system according to the above first preferred embodiment of the present invention.

FIG. 6 illustrates a fifth alternative mode of the emitter 10E which has an elongated turbulent flow region 26E defined between the inlet section 14E and the outlet section 18E, wherein the two venturi accelerators 20E are mounted on the inlet section 14E and the outlet section 18E respectively. The emitter 10E further comprises a plurality of protrusion 28E spacedly and radially protruded with in the turbulent flow region 26E for further dissipating the gravity potential through the turbulent flow region 26E. The protrusions 28E can be any suitable shape such as triangular, rectangular, or square shape functions as water resistors to provide a pressure compensating emitter 10E. The emitter 10E with such technical specification is more useful in the case of extremely high hydraulic potential, for example over 0.5 atmosphere (7 psi).

Figure 7:
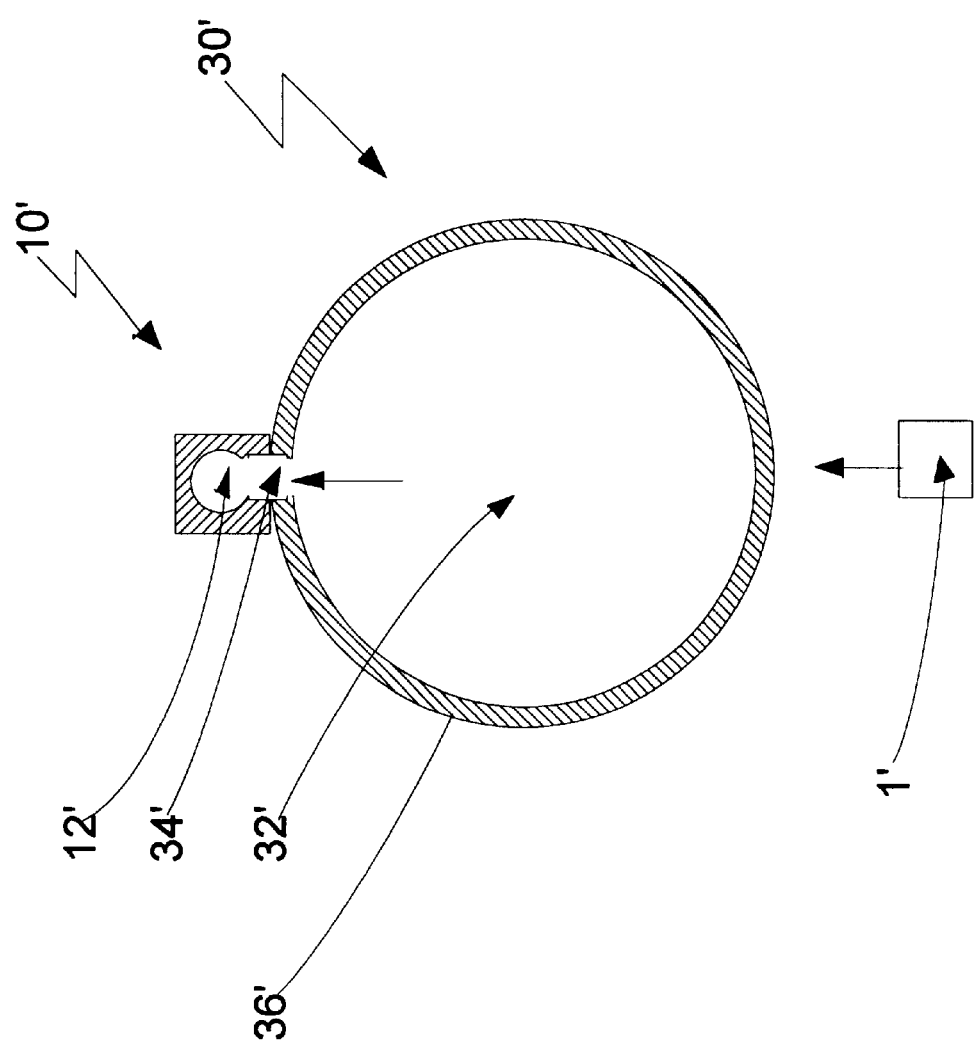
FIG. 7 is a sectional view of a self-discharging drip irrigation system according to a second preferred embodiment of the present invention.

Referring to FIG. 7 of the drawings, a second embodiment of a self-discharging drip irrigation system illustrates an alternative mode of the first embodiment of the present invention. According to the second embodiment, the non-pressure compensating emitter 10 described above, do not have to be formed in a discrete non-pressure compensating emitter 10, but can be located anywhere inside or outside of drip irrigation hose 30. For example the non-pressure compensating emitters 10' can be formed in the margin of drip irrigation hose 30', and the flow regulating passage 12' can be used in continuous and integral flow regulating passage 12' along the length of drip irrigation hose 30'. As shown in FIG. 7, the emitter 10' is attached to the inside of drip irrigation hose 30'. The self-discharging drip irrigation system of the second embodiment is more useful for installation in sub-surface ground and particularly for row crops.

The foregoing is considered as illustrative only of the principals of the invention. Further, since numerous modifications and changes will readily occur to those skilled in the art, it is not desired to limit the invention to the exact construction and operation shown and described, and accordingly all suitable modifications may be restored to, falling within the scope of the invention as claimed.

What is claimed is:

1. A self-discharging drip irrigation system, comprising:

at least an elongated drip irrigation hose, having a transiting waterway, for operatively extending from a water supply;

at least a non-pressure compensating emitter for directing water from said drip irrigation hose to a cultivating area, wherein said emitter comprises a flow regulating passage, wherein said flow regulating passage has at least an inlet section operatively connected to said drip irrigation hose and at least an outlet section for dripping said water to said cultivating area, wherein said flow regulating passage further comprises a laminar flow region defined between said inlet section and said outlet section, wherein a cross-sectional area of said laminar flow region is smaller than a diameter of said transiting waterway, wherein said flow regulating passage further comprises at least a cone shaped venture accelerator mounted on said inlet section, wherein said venture accelerator has an exit end having a diameter equal a diameter of said laminar flow region and an entrance end having a diameter larger than that of said exit end so as to speed up a water velocity; and whereby, said water supply is located in a position higher than said cultivating area so as to create a gravity potential therebetween.

2. The self-discharging drip irrigation system, as recited in claim 1, wherein said flow regulating passage further comprises a second venture accelerator, wherein said venture accelerator and said second venture accelerator are mounted on said water inlet section and said water dripping outlet respectively.

3. The self-discharging drip irrigation system, as recited in claim 2, wherein said flow regulating passage comprises a laminar flow region having a straight shaped conduit defined between said inlet section and said outlet section, wherein said laminar flow region has a smooth interior surface for reducing a friction thereof so as to eliminate risk of sedimentation through said laminar flow region.

4. The self-discharging drip irrigation system, as recited in claim 1, wherein said flow regulating passage comprises a laminar flow region having a straight shaped conduit defined between said inlet section and said outlet section, wherein said laminar flow region has a smooth interior surface for reducing a friction thereof so as to eliminate risk of sedimentation through said laminar flow region.

* * * * *